US008253684B1

(12) United States Patent  
Lloyd

(10) Patent No.: US 8,253,684 B1  
(45) Date of Patent: Aug. 28, 2012

(54) POSITION AND ORIENTATION DETERMINATION FOR A MOBILE COMPUTING DEVICE

(75) Inventor: Matthew I. Lloyd, Cambridge, MA (US)

(73) Assignee: Google Inc., Mountain View, CA (US)

( * ) Notice: Subject to any disclaimer, the term of this patent is extended or adjusted under 35 U.S.C. 154(b) by 4 days.

(21) Appl. No.: 12/938,043

(22) Filed: Nov. 2, 2010

(51) Int. Cl.  
*G09G 5/00* (2006.01)

(52) U.S. Cl. ............... 345/156; 345/157; 455/456.1

(58) Field of Classification Search .......... 345/156–169, 345/698; 715/702, 863; 704/270; 455/414.2, 455/456.1, 550.1  
See application file for complete search history.

(56) References Cited

U.S. PATENT DOCUMENTS

| | | | |
|---|---|---|---|
| 6,201,554 B1* | 3/2001 | Lands | 345/169 |
| 2002/0133350 A1* | 9/2002 | Cogliano | 704/270 |
| 2002/0180767 A1* | 12/2002 | Northway et al. | 345/698 |
| 2004/0224638 A1* | 11/2004 | Fadell et al. | 455/66.1 |
| 2006/0194181 A1* | 8/2006 | Rosenberg | 434/317 |
| 2007/0176898 A1* | 8/2007 | Suh | 345/158 |
| 2008/0174550 A1* | 7/2008 | Laurila et al. | 345/158 |
| 2008/0204407 A1* | 8/2008 | Ueno | 345/156 |
| 2008/0291163 A1* | 11/2008 | Liberty | 345/156 |
| 2009/0197615 A1* | 8/2009 | Kim et al. | 455/456.1 |
| 2009/0265627 A1* | 10/2009 | Kim et al. | 715/702 |
| 2010/0121636 A1 | 5/2010 | Burke et al. | |
| 2010/0136957 A1* | 6/2010 | Horodezky et al. | 455/414.2 |
| 2010/0235034 A1* | 9/2010 | Higgins | 701/28 |
| 2011/0041100 A1* | 2/2011 | Boillot | 715/863 |
| 2011/0106477 A1* | 5/2011 | Brunner | 702/104 |
| 2011/0111798 A1* | 5/2011 | Jeon et al. | 455/556.1 |
| 2011/0163944 A1* | 7/2011 | Bilbrey et al. | 345/156 |
| 2011/0216002 A1* | 9/2011 | Weising et al. | 345/158 |
| 2011/0260921 A1* | 10/2011 | Harrat et al. | 342/386 |

\* cited by examiner

*Primary Examiner* — Amare Mengistu  
*Assistant Examiner* — Premal Patel  
(74) *Attorney, Agent, or Firm* — Fish & Richardson P.C.

(57) ABSTRACT

For multiple times in a time period, multiple data points can be received from an accelerometer and from a magnetometer that are included in a mobile computing device. For each of the data points, an orientation and a position of the mobile computing device can be determined based on an acceleration output and a magnetometer output that corresponds to the particular time. A trajectory is determined that represents movement of the mobile computing device during the time period based on the determined orientations and positions of the mobile computing device at the multiple times. Information that characterizes the trajectory is compared to stored information that characterizes a set of one or more base trajectories. Based on the comparison, an operation of the mobile computing device is identified that is associated with a trajectory included in the set of one or more base trajectories.

15 Claims, 6 Drawing Sheets

POSITION AND ORIENTATION DETERMINATION FOR A MOBILE COMPUTING DEVICE

TECHNICAL FIELD

This document relates to determining a position and orientation of a mobile computing device.

BACKGROUND

The use of mobile computing devices has become increasingly widespread. Although lightweight and small, the portability of modern mobile computing devices often means small keyboards or other types of input devices that many users have difficulty using. Some mobile computing devices include a feature that allows the user to interact with the device using speech. For example, a user can place a telephone call to someone in his or her contact list simply by speaking a voice command (e.g., "call") and the name of the contact into the device. Distinguishing the user's speech from background noise can be difficult in some environments. Additionally, it can be challenging to begin recording speech at the right time. For example, if recording begins after the user has started speaking, the resulting recording may not include all of the user's voice command. Furthermore, this may result in the user being notified that a voice command was not recognized by the device (because it was only partially received), which can be frustrating for the user.

SUMMARY

In general, in one aspect, methods, computer program products encoded on computer readable mediums and systems are described wherein, for multiple times in a time period, multiple data points are received from an accelerometer and from a magnetometer. The accelerometer and the magnetometer are included in a mobile computing device. For each of the data points, an orientation and a position of the mobile computing device is determined based on an acceleration output and a magnetometer output that corresponds to the particular time. A trajectory is determined that represents movement of the mobile computing device during the time period based on the determined orientations and positions of the mobile computing device at the multiple times. Information that characterizes the trajectory is compared to stored information that characterizes a set of one or more base trajectories. Based on the comparison, an operation of the mobile computing device is identified that is associated with a trajectory included in the set of one or more base trajectories.

Implementations may include some, none or all of the following additional features. In response to identifying the operation, the operation can be automatically initiated on the mobile computing device. Identifying the operation of the mobile computing device can include recognizing that a user holding the mobile computing device has made a gesture that corresponds to the trajectory and that is associated with the operation of the mobile computing device. The recognized gesture can be a gesture associated with the operation of voice recording and a voice recording operation can be automatically initiated in response to recognizing that the user has made the gesture.

Each accelerometer output can include a gravity component and a positional component. Determining an orientation and a position of the mobile computing device can include: (1) determining an orientation of the mobile computing device based on the magnetometer output and (2) determining the gravity component of the accelerometer output based on the determined orientation of the mobile computing device, determining the positional component of the acceleration output based on the gravity component, and determining the position of the mobile computing device based on the positional component of the accelerometer output.

In general, in another aspect, a mobile computing device includes an accelerometer configured to provide an accelerometer output that indicates an acceleration of the mobile computing device and a magnetometer configured to provide a magnetometer output that indicates a direction the mobile computing device is pointing relative to magnetic North. The device further includes a processor and a storage device coupled to the processor and configurable for storing instructions, which, when executed by the processor cause the processor to perform operations. The operations includes receiving, for multiple times in a time period, multiple data points from the accelerometer and multiple data points from the magnetometer. For each of the multiple times in the time period, an orientation and a position of the mobile computing device is determined based on an acceleration output and a magnetometer output that corresponds to the particular time. A trajectory is determined that represents movement of the mobile computing device during the time period based on the determined orientations and positions of the mobile computing device at the multiple times in the time period. Based on a comparison of information that characterizes the trajectory to a set of one or more base trajectories, an operation of the mobile computing device that is associated with a trajectory included in the set of one or more base trajectories is automatically launched.

Implementations of the device can include some, none or all of the following features. The operations can further include comparing the information characterizing the trajectory to the set of one or more base trajectories and, based on the comparison, identifying the operation of the mobile computing device that is associated with the trajectory included in the set of one or more base trajectories. Identifying the operation of the mobile computing device can include recognizing that a user holding the mobile computing device has made a gesture that corresponds to the trajectory and that is associated with the operation of the mobile computing device. The recognized gesture can be a gesture associated with the operation of voice recording.

Each accelerometer output can include a gravity component and a positional component. Determining an orientation and a position of the mobile computing device can include (1) determining an orientation of the mobile computing device based on the magnetometer output; and (2) determining the gravity component of the accelerometer output based on the determined orientation of the mobile computing device, determining the positional component of the acceleration output based on the gravity component, and determining the position of the mobile computing device based on the positional component of the accelerometer output.

The systems and techniques described can realize none, some or all of the following advantages. A user operation with respect to a mobile computing device can be anticipated before the user has initiated the operation. The operation can thereby be launched automatically, saving the user from having to input a request to initiate the operation. For example, if the user is about to use the mobile computing device to input a voice command, in anticipation of receiving a voice command the device can automatically launch a voice recording operation without requiring an explicit user input. The entire voice command can therefore be recorded, as compared to if the voice recording operation did not launch until after the user had started speaking. The voice command is therefore more likely to be successful (i.e., recognized) and the user experience is enhanced.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes systems and techniques for using output from an accelerometer and a magnetometer included in a mobile computing device to make determinations about a user's current use of the mobile computing device. For example, the output can be used to determine that a user is inputting or about to input a voice command into the mobile computing device.

Figure 1:
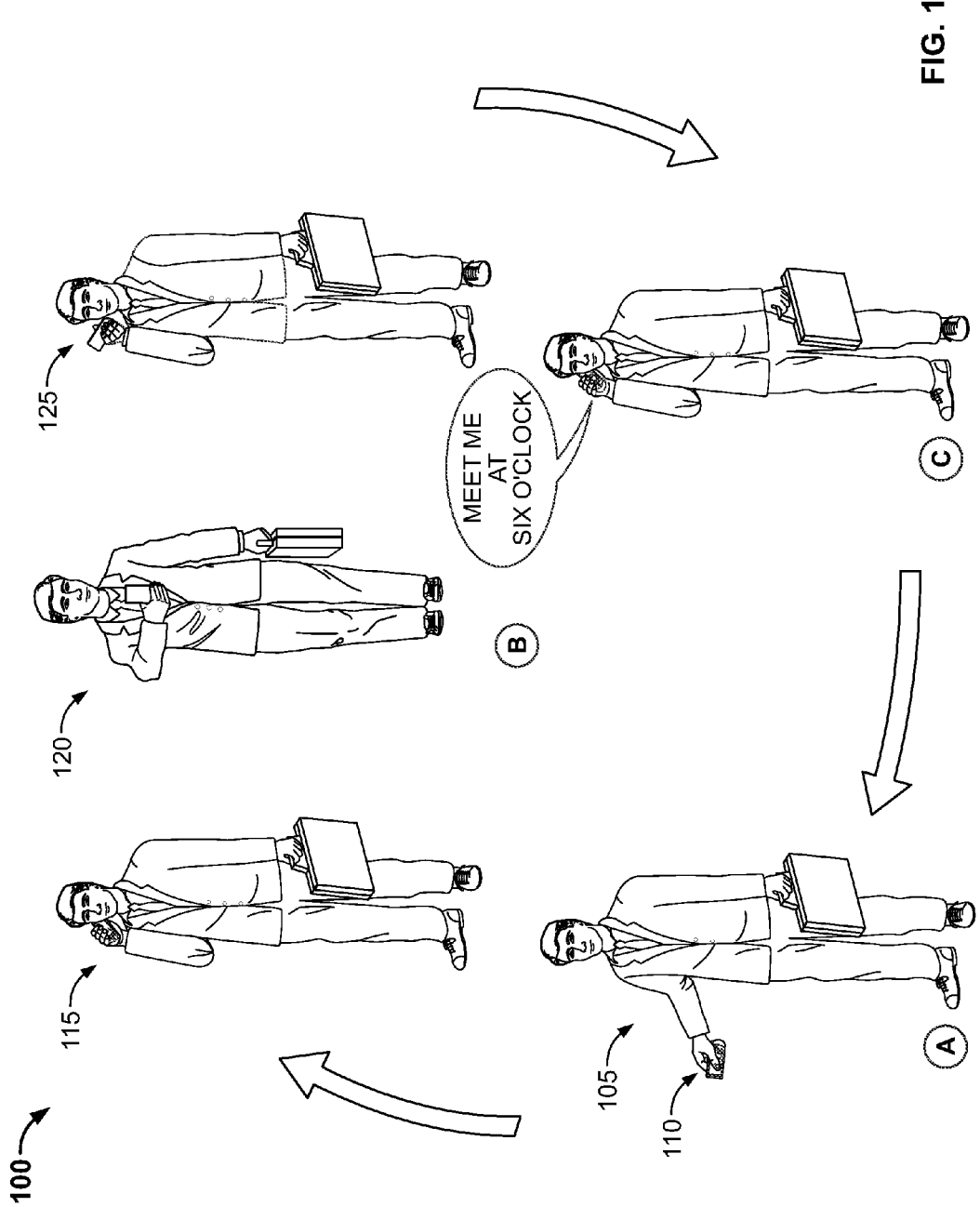
FIG. 1 is a schematic representation of a user of a mobile computing device holding the mobile computing device in various positions

FIG. 1 is a schematic representation of a user 105 of a mobile computing device 110 holding the mobile computing device in various positions. The mobile computing device 110 may be a cellular telephone, PDA, laptop, smartphone, or other appropriate portable computing device. In the illustrative example shown in FIG. 1, the user 105 may want to interact with an application that is running on the mobile computing device 110. For instance, the user may want to search for the address of a business using a Web-based application such as GOOGLE MAPS. Typically, the user 105 would use the mobile computing device 110 to type the name of the business into a search box on an appropriate website to conduct the search. However, the user 105 may be unwilling or unable to use the device 110 to type the necessary information into the website's search box.

The user 105 may conduct the search by simply placing the mobile computing device 110 in a natural voice-input operating position and speaking the search terms. For example, in some implementations, the device 110 may begin or end recording speech by identifying the position and orientation of the device 110. The recorded speech (or text corresponding to the recorded speech) may be provided as input to a selected search application.

The letters "A," "B," and "C" in FIG. 1 represent different states in the illustrative example. In State A, the user 105 is holding the device 110 in a non-operating position. For example, between uses, the user 105 may hold the device 110 at his side or place the device in a pocket or bag. If the device 110 has such a position and orientation, the device 110 is probably not in use, and it is unlikely that the user 105 is speaking a voice command into the mobile computing device 110. As such, the device 110 may be placed in a non-voice-recording mode.

When the user 105 wants to use the device 110, the user 105 may place the device 110 in an operating position. In the illustrative example shown in the diagram 100, the device 110 may determine when it has moved through a trajectory that has placed the device 110 into an operating position (or pose). That is, for the user to switch from State A to State B, the user makes a gesture with his arm as he raises the device 110 upward through a trajectory into a State B pose. State B shows the mobile computing device 110 in several example poses. For example, the left-most figure in State B illustrates a "telephone pose" 115. A telephone pose can, in some implementations, correspond to the user 105 holding the mobile computing device 110 in a position commonly used to speak into a telephone. For example, as shown in FIG. 1, the device 110 may be held to a side of the user's 105 head with the speaker of the device 110 held near the user's 105 ear. Holding the device 110 in this way can make it easier for the user 105 to hear audio emitted by the device 110 and speak into a microphone of the device 110.

The middle figure shown in State B depicts the user 105 holding the device 110 in a "PDA pose" 120. For example, the PDA pose 120 may correspond to the user 105 holding the mobile computing device 110 at nearly arm's length and positioned so that the user 105 can see and interact with the mobile computing device 110. For instance, in this position, the user 105 can press buttons on the keypad of the device 110 or a virtual keyboard displayed on the device's 110 screen. In some cases, the user 105 may also enter voice commands into the device 110 in this position.

Finally, the right-most figure shown in State B illustrates a "walkie-talkie pose" 125. In some cases, a walkie-talkie pose 125 may comprise the user 105 holding the mobile computing device 110 to his face such that the device's 110 microphone is close the user's 105 mouth. This position may allow the user 105 to speak directly into the microphone of the device 110, while also being able to hear sounds emitted by a speakerphone linked to the device 110. Although FIG. 1 shows three poses, others may be used.

When the device 110 is identified as having gone through a trajectory to move into a predetermined pose, the device 110 may begin recording auditory information, such as speech from the user 115. For example, State C depicts a user speaking into the device 110, while the device 110 is in the telephone pose. Because, in some implementations, the device 110 may begin recording auditory information when the device 110 is detected in the telephone pose 115, the device 110 may begin recording just before (or as) the user 105 starts speaking. As such, the device 110 may capture the beginning of the user's speech.

When the device 110 leaves a pose, that is, another gesture is detected that corresponds to the device 110 moving out of the operating position, the device 110 may stop recording. For instance, in the example shown in FIG. 1, after the user 105 finishes speaking into the device 110, he may execute a gesture that corresponds to returning the device 110 to a non-operating position by, for example, placing the device 110 by his side as shown at State A. When the device 110 leaves a pose (telephone pose 115 in the current example), the device 110 may stop voice recording. In some cases, the information recorded by the device 110 up to this point can be provided to an application running on the device or on a remote device. For example, as noted above, the auditory information can be converted to text and supplied to a search application being executed by the device 110.

Techniques and systems for using accelerometer and magnetometer input to determine whether the device 110 has moved through a trajectory that corresponds to a gesture to move the device 110 into an operating position are discussed in further detail below.

Figure 2:
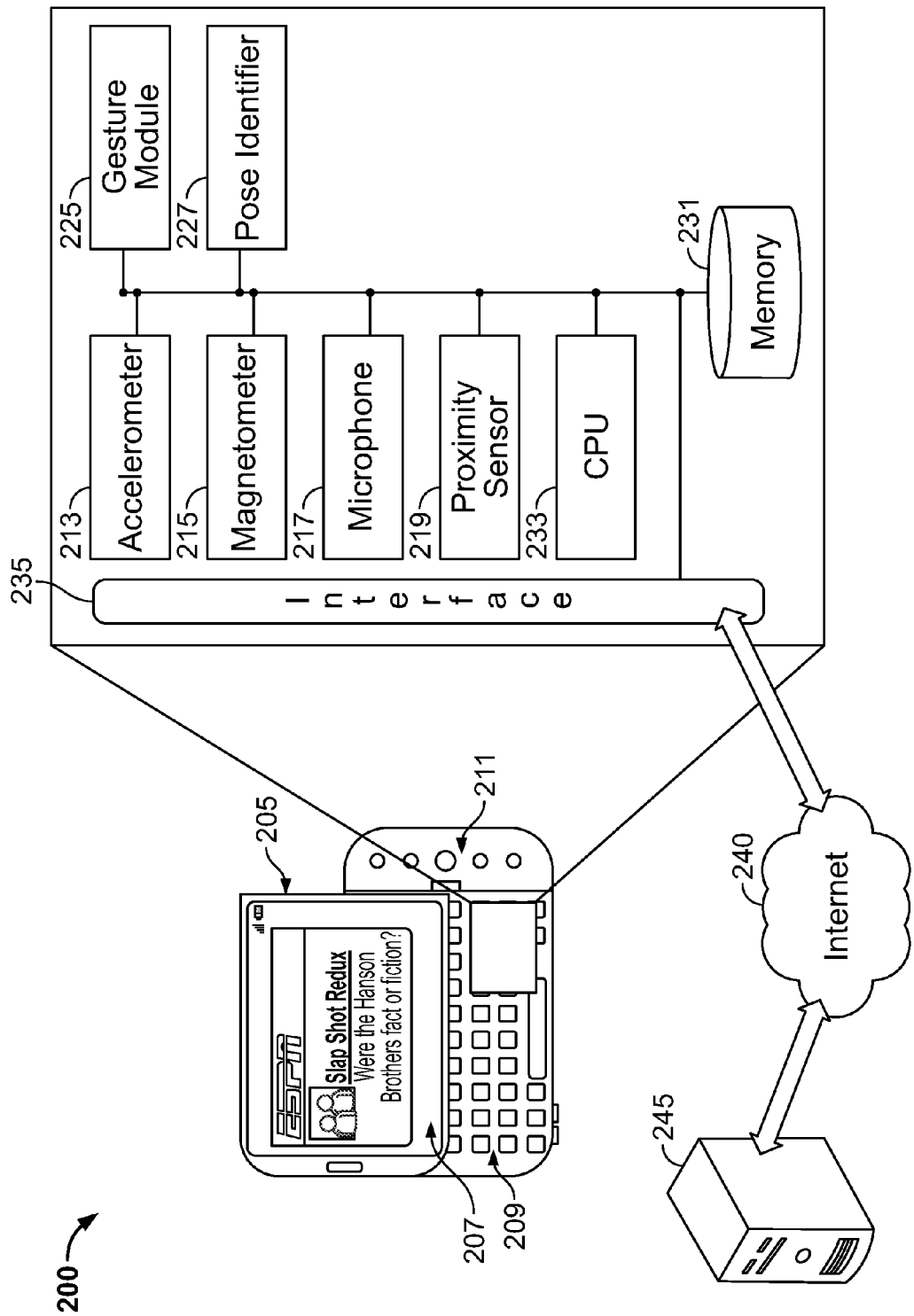
FIG. 2 is a block diagram of an example mobile computing device.

FIG. 2 is a block diagram of an example mobile computing device. The device 205 includes a screen 207 that, in some cases, can be used to both display output to a user and accept user input. For example, the screen 207 may be a touch screen that can display a keypad that can be used to enter alphanumeric characters. The device 205 may also include a physical keypad 209 that may also be used to input information into the device. In some cases the device 205 may include a button (not shown) on the keypad 209 or another part of the phone (e.g., on a side of the phone) that starts and stops a speech application running on the device 205. Finally, the device 205 can incorporate a trackball 211 that, in some cases, may be used to, among other things, manipulate a pointing element displayed on a graphical user interface on the device 205.

The device 205 may include one or more sensors that can be used to detect speech readiness, among other things. For example, the device 205 includes an accelerometer 213. The accelerometer 213 may be used to determine an acceleration of the device and supply this information to other device 205 components. The device 205 includes a magnetometer 215 that can be used to determine an orientation of the device.

In addition to the accelerometer 213 and magnetometer 215, the device 205 may also include a proximity sensor 219. In some cases, the proximity sensor 219 can be used to determine how far the device 205 is from a user. For example, the proximity sensor 219 may include an infrared sensor that emits a beam of infrared light and uses the reflected signal to compute the distance to an object. In alternative implementations, other types of sensors may be used. For example, the sensor may be capacitive, photoelectric, or inductive, among other kinds of sensors. The device can also include a camera (not shown) and signals from the camera can be processed to derive additional information about the pose of the device.

The device includes a central processing unit 233 that executes instructions stored in memory 231. The processor 233 may include multiple processors responsible for coordinating interactions among other device components and communications over an I/O interface 235. The device 205 may communicate with a remote computing device 245 through the internet 240. Some or all of the processing performed by the gesture module 225 and pose identifier 227 can be performed by the remote computing device 245.

A microphone 217 may capture auditory input and provide the input to one or more applications executing on the device 205. The device 205 includes a memory 231 (e.g, RAM or a hard drive).

The device 205 includes a gesture module 225. The gesture module 225 can be used to classify movement of the device 205. The accelerometer 213 and magnetometer 215 supply information to the gesture module 225 that the gesture module 225 uses to determine whether a particular gesture has occurred by the user that is holding the device 205. For example, the gesture module 225 can classify movement of the phone into groups such as "shake" and "flip." In addition, the gesture module 225 may also classify motion related to gestures such as "to mouth," "from mouth," "facing user," "to ear," and "from ear."

A pose identifier 227 included in the device 205 may infer/detect different poses of the device 205. The pose identifier 227 may use data provided by the proximity sensor 219 and the gesture module 225 to identify poses. For example, the pose identifier 227 may determine how far the device 205 is from an object (e.g., a person) using information provided by the proximity sensor 219. This information, combined with a gesture classification provided by the gesture module 225 can be used by the posture identifier 227 to determine which pose (if any) the device 205 has been placed in. In one example, if the gesture module 225 transmits a "to ear" classification to the pose identifier 227 and the proximity sensor 219 indicates that the device is being held close to the user, the pose identifier 227 may determine that the device 205 is in telephone pose. A camera can also be used to provide evidence about movement. For example, the optical flow detected by the camera may provide evidence of movement.

Figure 3A:
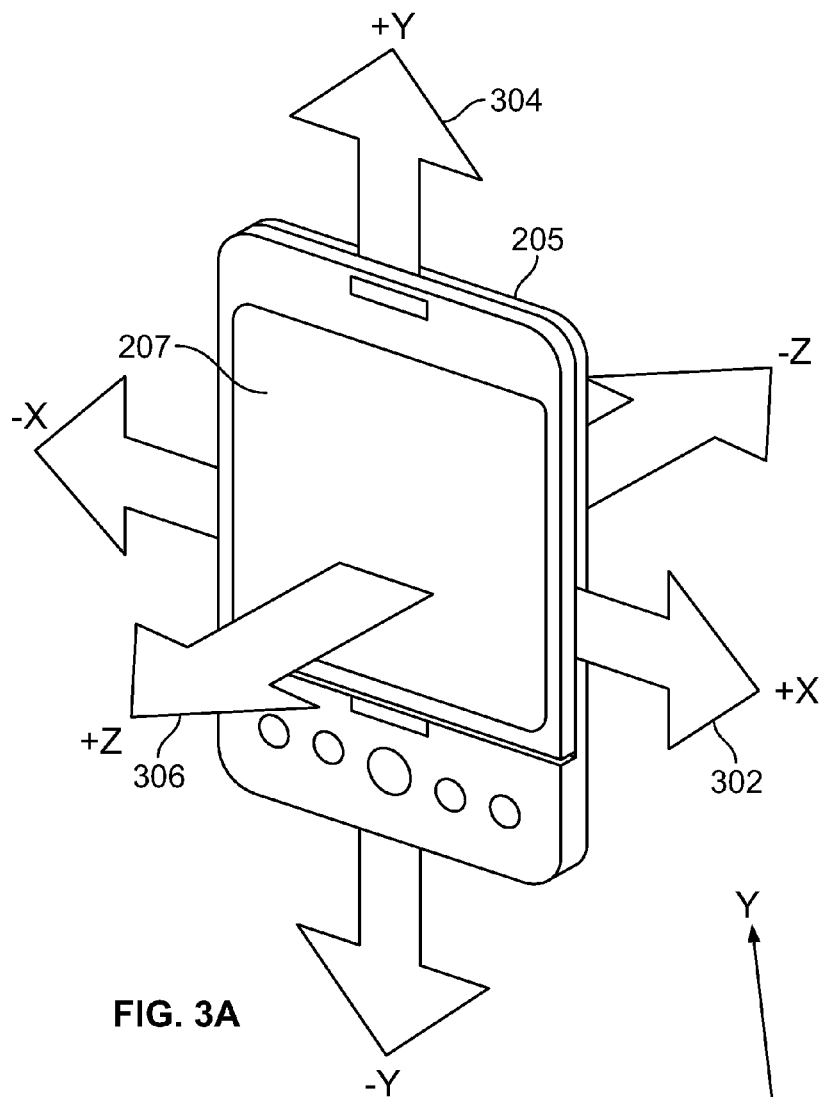
FIG. 3A shows the mobile computing device of FIG. 2 relative to a 3-dimensional coordinate system.

FIG. 3A shows the mobile computing device 205 of FIG. 2 relative to a 3-dimensional coordinate system. The X-axis 302 is parallel to the width of the device 205, the Y-axis 304 is parallel to the length of the device and the Z-axis 306 is perpendicular to the display 207 of the device 305.

Figure 3B:
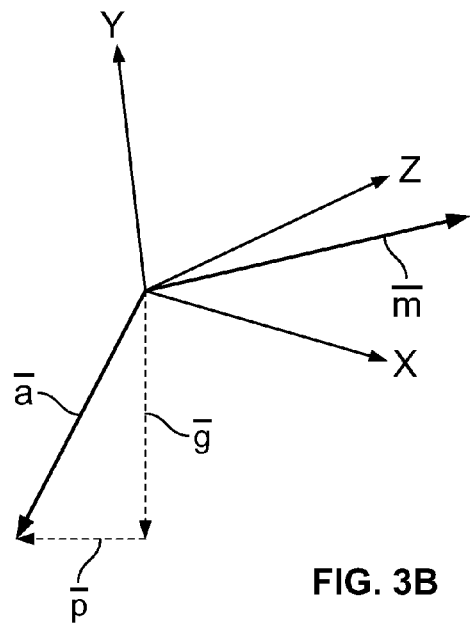
FIG. 3B illustrates example output data from an accelerometer and magnetometer relative to the example coordinate system of FIG. 3A.

FIG. 3B illustrates example output data from an accelerometer and magnetometer relative to the example coordinate system of FIG. 3A. The example data can be from the accelerometer 213 and magnetometer 215 shown in the device 205 in FIG. 2. The example data from the accelerometer 213 is represented as an acceleration vector a. The vector a is the combination of two vectors: the gravity vector g and a positional acceleration vector p. The gravity vector has two degrees of freedom. That is, the gravity vector can be described by azimuth and elevation angles. The vector length is constant at approximately 9.81 N, i.e., the downward pull of gravity to the Earth. The positional acceleration vector represents acceleration due to the device 205 accelerating as the position of the device 205 is changed and has three degrees of freedom. That is, the positional acceleration vector can be described by x, y and z coordinates relating to the 3-D coordinate system shown.

Therefore, the total degrees of the freedom of the acceleration vector of the device 205 is five; that is, two for the gravity vector and three for the positional acceleration vector. However, the output signal from the accelerometer 213 has only three degrees of freedom, i.e., the x, y and z coordinates that describe the acceleration vector a. Accordingly, two degrees of freedom are lost and the accelerometer output data, taken on its own, can be ambiguous. That is, there are multiple different combinations of gravity vectors and positional acceleration vectors that can produce the same acceleration vector, depending on the orientation of the device 205. If the device 205 is tilted to one side or the other, the same acceleration vector can be output from the accelerometer 213, even though the positional acceleration vector in both instances can be different.

The example output data from the magnetometer 215 shown in FIG. 3B is a vector m. The vector m points in the North direction. The magnetometer 215 output data, i.e., vector m, has two degrees of freedom and can be described by azimuth and elevation angles. The vector length that represents the magnetic field strength is approximately constant. The vector m expressed in x, y and z coordinates can be converted to elevation and azimuth angles using the relationships below between the Cartesian coordinates and the elevation and azimuth angles:

$$\theta(\text{elevation}) = \arccos[y/(\sqrt{\{x^2+y^2+z^2\}})]$$

$$\Phi(\text{azimuth}) = \operatorname{atan2}(z, x)$$

The combined output from the accelerometer 213 and the magnetometer 215 has a total of five degrees of freedom, i.e., three from the accelerometer output and 2 from the magnetometer output. The additional two degrees of freedom provided by the magnetometer output can be used to disambiguate the output from the accelerometer. That is, in instances where the accelerometer output is identical for a first orientation and a second orientation of the device 205, the magnetometer output is not identical, and therefore the two instances can be distinguished from each as two different orientations. The magnetometer output can be used to determine the orientation of the device 205 (i.e., the direction in which the device is pointing). The gravity vector g at the determined orientation can be computed and then subtracted from the acceleration vector a. The resulting vector is the positional acceleration vector p. The positional acceleration vector p can therefore be determined apart from the combined acceleration vector a, i.e., the output from the accelerometer 213.

A position and orientation timeseries describes the position and orientation of the device 205 at a series of different times and can be determined based on the combined output of the accelerometer 213 and magnetometer 215 at a series of points in time. The timeseries thereby represents a trajectory through which the device 205 has traveled during the points in time. The trajectory corresponds to a gesture made by the user that is holding the device 205.

Figure 4:
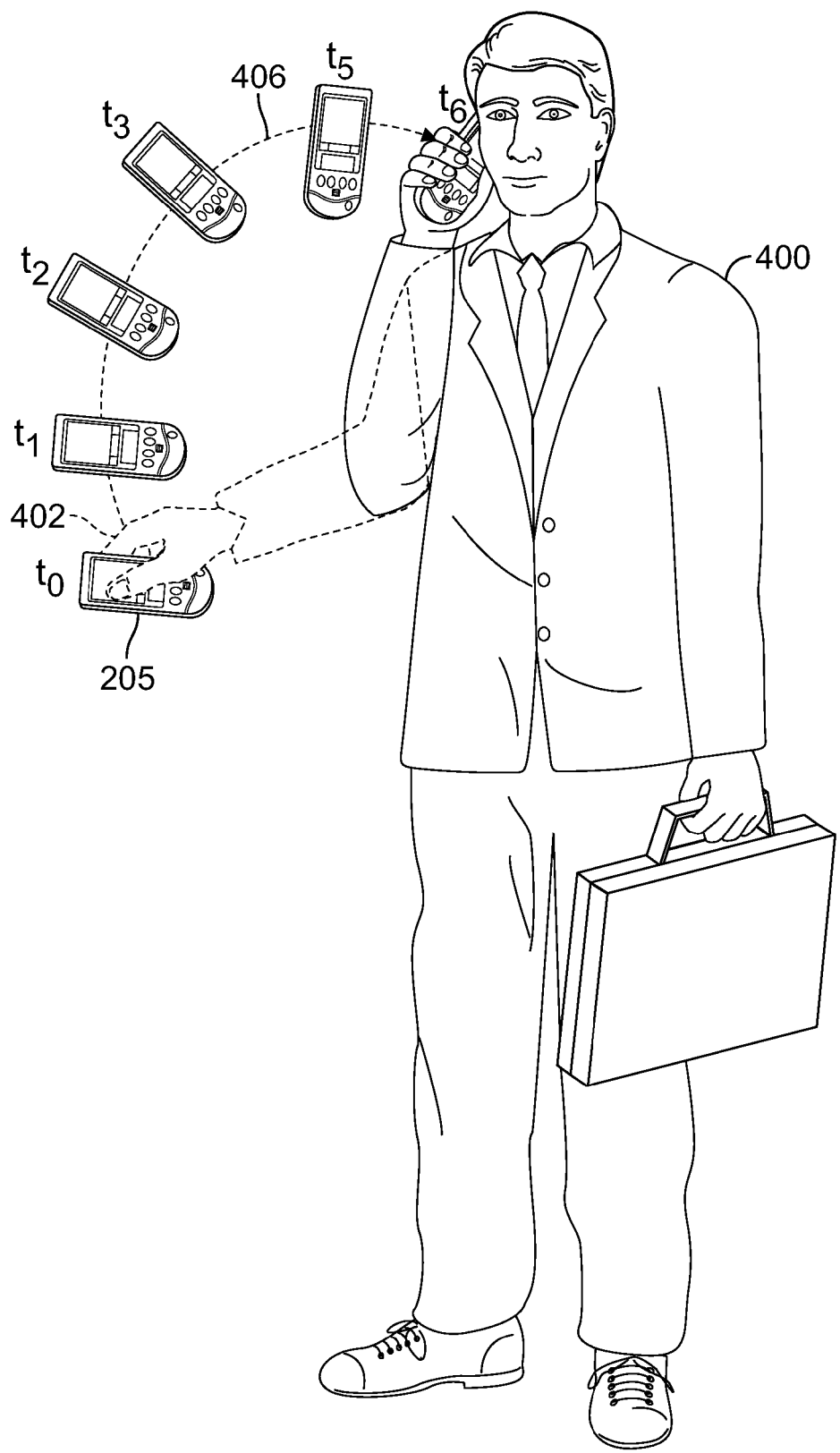
FIG. 4 shows a user making a gesture while holding a mobile computing device in his right hand.

FIG. 4 shows a user 400 making a gesture while holding a mobile computing device 205 in his right hand 402. Initially, at time $t_0$, the user 400 is holding the device 205 in a non-operating position. During a series of points in time, represented as $t_1$ through $t_6$, the user 400 moves the device 205 through a trajectory 406 as he makes a gesture to raise the device 205 to his ear and into an operating position at time $t_6$. In this illustrative example, the timeseries is simplified and includes 6 points in time. However, in practice, the timeseries can include many more points in time between the time $t_0$ and the time $t_6$. In an illustrative, non-limiting example, the number of points in time is 30.

The trajectory 406 traversed by the device 205 can be compared to a set of one or more trajectories that correspond to user gestures. If a particular gesture is associated with a particular operation of the device 205, the operation can be anticipated by recognizing that the device 205 has traveled through a trajectory that corresponds to the particular gesture. For example, if the gesture is associated with a user action of moving the device into a voice-input operating position (i.e., a voice recording operation), then if the gesture is recognized as having occurred, the user is probably about to speak a voice input into the device 205. By anticipating that the user is about to speak a voice input into the device 205, the device 205 can be automatically put into a voice recording mode, which may or may not be signaled to user (e.g., by an audible, tactile or visual signal).

Figure 5:
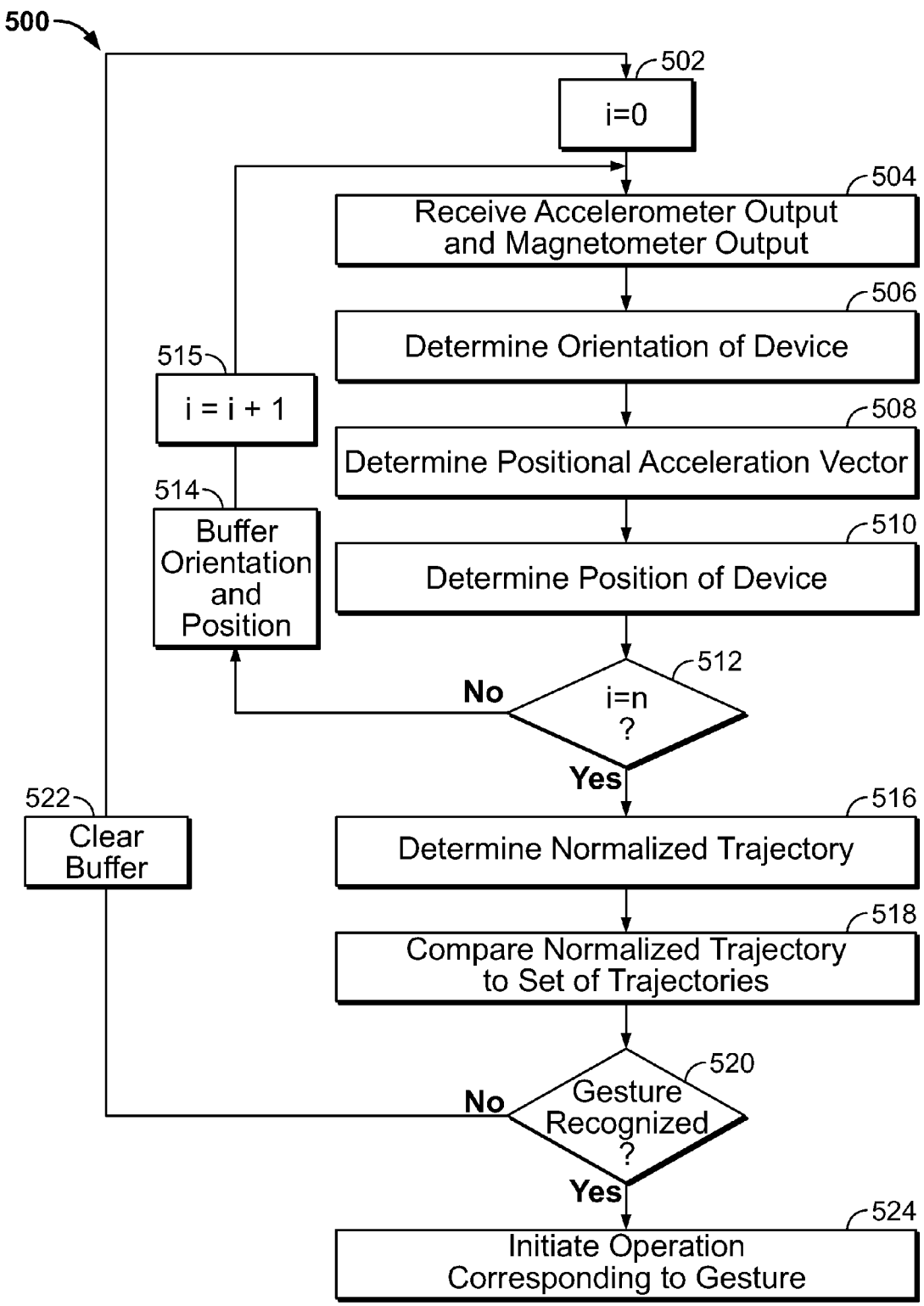
FIG. 5 is a flowchart showing an example process for determining whether to initiate an operation on a mobile computing device based on a movement of the device.

FIG. 5 is a flowchart showing an example process 500 for determining whether to initiate an operation on a mobile computing device based on a movement of the device. A position and orientation timeseries is generated from n outputs received from an accelerometer and a magnetometer of the mobile computing device. For illustrative purposes, the process 500 is described in reference to the device 205 shown in FIG. 2, however, it should be understood that a differently configured device can be used to perform the process 500. For purposes of illustrating that n outputs are received into a buffer, which in one example can be the memory 231 of the device 205, an integer i is used as a counter in the process 500 as shown.

Initially i is equal to zero (i.e., when the process initially begins). An accelerometer output and a magnetometer output are received (Box 504). For example, an output from the accelerometer 213 and the magnetometer 215 can be received at the gesture module 225. An orientation of the device is determined (Box 506) based on the magnetometer output. That is, the vector m can be used to determine a direction in which the device 205 is facing and thereby determine the orientation of the device 205.

A positional acceleration vector (i.e., positional acceleration vector p) is determined (Box 506). As described above, once the orientation of the device 205 is known, the gravity vector g can be computed and subtracted from the acceleration vector a that is the accelerometer output. The remaining vector is the positional acceleration vector p. In the example device 205 shown, the gesture module 225 can determine the positional acceleration vector. Once the positional acceleration vector p is known, the position of the device is determined (Box 508). That is, the position of the device 205 can be determined based on the last-known position of the device 205, the time that has passed since the device 205 was in the last-known position and the positional acceleration vector p, which represents the positional acceleration of the device 205 since the last accelerometer output. In this example, the gesture module 225 can determine the position of the device 205. The orientation and the position of the device 205 at the current time are therefore determined. Referring again to FIG. 4 for illustrative purposes, if the current time is $t_1$, the orientation and position of the device 205 as shown at $t_1$ has been determined.

If the integer i does not yet equal n, i.e., the desired number of output data points ("No" branch of determination 512), then the orientation and position of the device 205 as determined are buffered (Box 514), e.g., stored in the memory 231, the integer i is incremented by 1 (Box 515), and the process 500 repeats starting at Box 504 until n data output data points, i.e., n sets of position and orientation data, is collected in the buffer.

Once the integer i does equal n, i.e., the desired number of output data points have been buffered ("Yes" branch of determination 512), a trajectory that represents the movement of the device from time $t_0$ to time $t_0$ can be generated based on the buffered output data points of position and orientation of the device at the n points in time. The trajectory can be "normalized" by manipulating the trajectory to an artificial starting point at time $t_0$ (Box 516). For example, the trajectory can be rotated in space so that at time $t_0$ the device 205 is always pointing North. Normalizing the trajectory allows the trajectory to be compared to a set of one or more trajectories that correspond to known gestures (Box 518), where the one or more trajectories have been normalized in the same way. The manner of normalizing the trajectory described in this example, i.e., such that the device starts pointing North, is an illustrative example and other starting positions and orientations can be used instead. In this example, the gesture module 225 can determine and normalize the trajectory.

A gesture that corresponds to the trajectory 406 of the device 205 can be recognized ("Yes" branch of determination 520) if the trajectory 406 is found to correspond to a trajectory included in the set of one or more trajectories to which the trajectory 406 is compared. For example, if the trajectory 406 matches within a predetermined tolerance a trajectory in the set of trajectories, then the gesture associated with the matching trajectory is recognized as the gesture made by the user 400 when moving the device 205 through the trajectory 406. In some implementations, a Gaussian Mixture Model (GMM) is used to classify the trajectory, with a single GMM for each trajectory to match against. Standard pattern classification techniques, e.g., Baye's theorem, can be used to determine the probability of each trajectory given the data.

The one or more trajectories in the set of trajectories are associated with a corresponding gesture and an operation that is to be initiated when the gesture is recognized as having occurred. For example, the trajectory 406 shown in FIG. 4 corresponds to a gesture of a user moving the device from a non-operating position into a voice-input operating position. The operation of "voice recording" can be associated with the gesture, so that once the gesture is recognized as having occurred, the voice recording operation can be automatically launched without requiring any additional user action or without explicit user input (i.e., without the user explicitly instructing the device to enter voice recording mode).

If after comparing the normalized trajectory to the set of trajectories a gesture is not recognized (i.e., there is no match) ("No" branch of determination 520), then the buffer is cleared of the n data points (i.e., n orientations and positions) (Box 522) and the process begins again at Box 502. In some implementations, outputs from the accelerometer 213 and magnetometer 215 are buffered and a comparison of the determined trajectory to the set of trajectories occurs approximately 10 times per second, although the process 500 can occur more or less frequently than that. In some implementations, the buffer operates as a ring buffer or a circular buffer in that at Box 522, rather than clearing all data points from the buffer, only the x oldest data points are cleared from the buffer, where x is an integer that is less than n. For example, x can be 1, meaning only the oldest data point is cleared from the buffer to make room for one new data point. If x is 3, then three data points can be removed from the buffer to make room for three new data points. In these implementations, at Box 502, rather than re-set i to 0, i can be reset to i=i−x+1, after x data points have been cleared from the buffer.

There can be multiple trajectories that correspond to approximately the same gesture. In some implementations, all of the multiple trajectories are included in the set of trajectories. In other implementations, the multiple trajectories are averaged and the averaged trajectory plus a standard deviation are included in the set of trajectories. In some implementations, rather than normalizing the trajectory to an artificial starting point, the set of trajectories can include the trajectories at multiple different starting points, and the determined trajectory (without being normalized) can be compared to the set of trajectories.

The set of one or more trajectories can be stored in memory on the mobile computing device, for example, in the memory 231. In other implementations, the set of one or more trajectories are stored remote to the mobile computing device, for example, at remote computing device 245. In such implementations, the comparison of the trajectory to the set of one or more trajectories can occur at the remote computing device 245. That is, the mobile computing device can transmit either the trajectory itself, or data from which the trajectory can be determined (e.g., the accelerometer and magnetometer outputs or the determined positions and orientations of the device during the timeseries), to the remote computing device 245. In response, the mobile computing device 205 can receive from the remote computing device 245 an output indicating an operation that is associated with the trajectory, an output indicating that no operation was found, or no output at all (e.g., in the absence of finding a match). When the mobile computing device 205 receives an output that indicates an operation is associated with the trajectory, the mobile computing device 205 can automatically launch the operation. Voice recording is an example operation, however, other types of operations can be associated with a gesture. Some other example operations include (but are not limited to): "throwing" the device a short distance (e.g., few inches) to send a message; shaking the device to erase a current input; bringing the device to one's ear to answer an incoming telephone call; holing the device in the air for a moment to connect to a network (e.g., Wifi or cellular); moving the device in a circular motion to refresh a web page displayed in a web browser. A user can customize their device to associate various gestures with corresponding operations and can also "train" the device to recognize gestures not already included in the set of trajectories that correspond to gestures.

In some implementations, predictive analytics can be used to determine the one or more trajectories included in the set of trajectories. Various types of predictive models can be used to analyze data and generate predictive outputs. The number of different types of predictive models available is extensive. Some examples of types of predictive models include (without limitation) Gaussian Mixture Models (GMM), regression models (e.g., linear regression, logistic regression), classification and regression tree models, multivariate adaptive regression spline models and other machine learning models (e.g., Naïve Bayes, k-nearest neighbors, Support Vector Machines, Perceptron).

Typically, a predictive model is trained with training data that includes input data and output data that mirror the form of input data that will be entered into the predictive model and the desired predictive output, respectively. In some implementations, the training data includes as input data a set of trajectories that occurred immediately prior to a user initiating a particular operation, for example, a voice recording operation. The input data can be the trajectories and the output data can be the associated gesture and/or operation. The model can thereby be trained with gesture movement of the particular user or users of the particular mobile computing device.

During a training period, each time a user initiates the particular operation, e.g., a voice recording operation, which he or she may do by issuing an explicit instruction to the device or simply by beginning to speak into the device, a trajectory that describes the movement of the device just prior to the operation initiating can be identified as input data to be included in the training data. The input data can be associated with output data that indicates a particular gesture and/or operation, e.g., the gesture "to the mouth" or "to the ear" or the operation "voice recording" or "telephone call". The training data, i.e., the input data and the output data, can be used to train the predictive model. Once the model is trained, input data in the form of trajectories (which can be normalized as described above) can be received by the trained model and, in response, the trained model can determine whether the trajectory is associated with an operation to be launched on the mobile computing device. Training the model and/or executing the trained model can occur on the mobile computing device or on a remote computing device.

In other implementations, rather than training a model with training data specific to the user or users of a particular mobile computing device, a generic set of trajectories can be used. That is, trajectories that typically occur immediately prior to one or more operations occurring can be determined, for example, by experimentation, and the set of trajectories can be populated with the determined trajectories. The trajectories can each be associated with a gesture and/or an operation of the mobile computing device. The set of trajectories can be stored on the mobile computing device or stored on a remote computing device that can either provide access to the set of trajectories or can perform the comparison of a trajectory to the set of trajectories, and provide the corresponding output to the mobile computing device.

Figure 6:
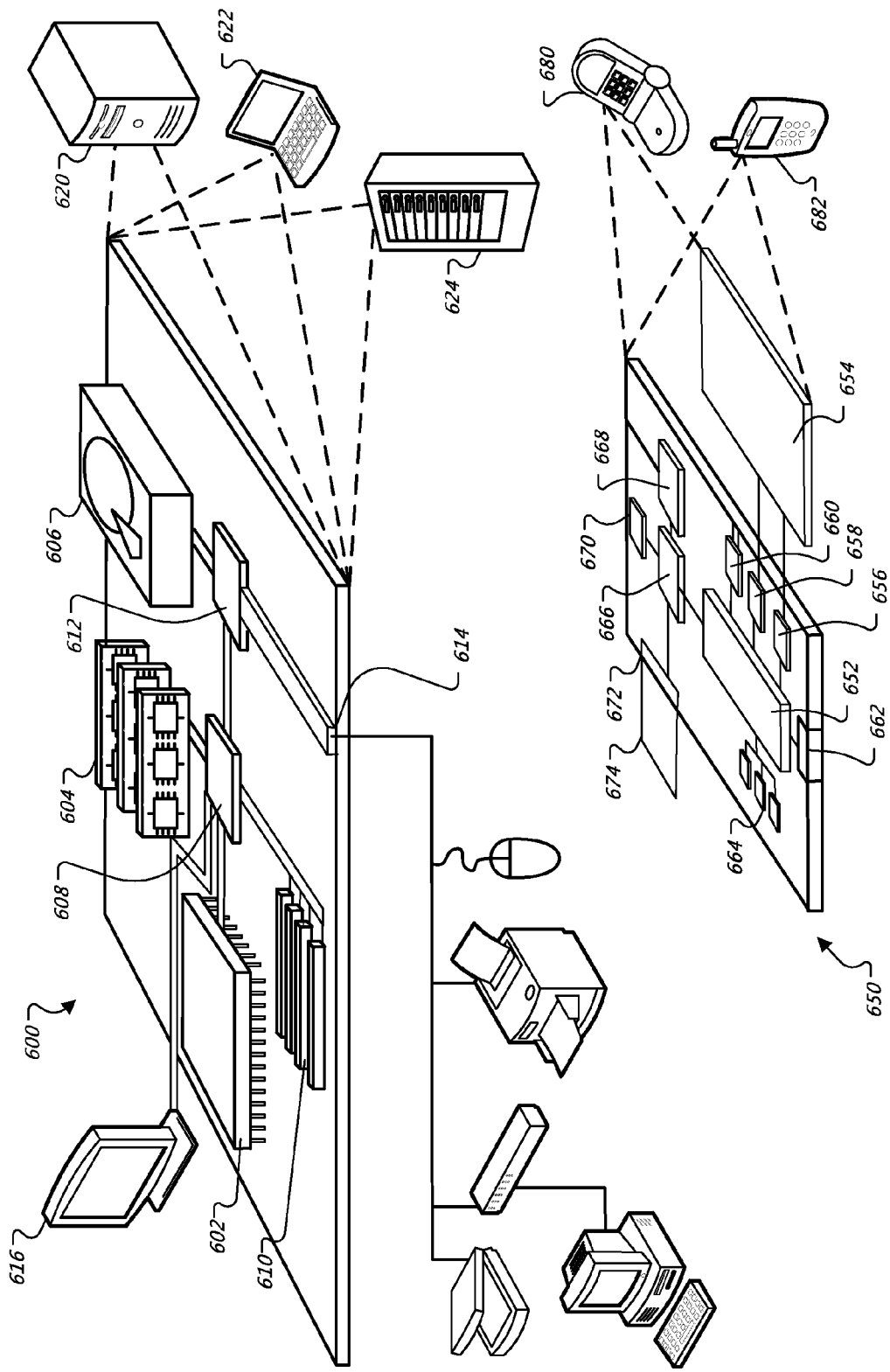
FIG. 6 shows examples of generic computer devices that may be used to execute the actions discussed in this document.

FIG. 6 shows an example of a computer device 600 and a mobile computing device 650, which may be used with the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 may process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier is a computer- or machine-readable medium, such as the memory 604, the storage device 606, memory on processor 602, or a propagated signal.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 may execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 may be implemented as one or more of a computer-readable medium or media, a volatile memory unit or units, or a non-volatile memory unit or units. Expansion memory 674 may also be provided and connected to device 650 through expansion interface 672, which may include, for instance, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or a propagated signal that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Device 650 may also include one or more different devices that are capable of sensing motion. Examples include, but are not limited to, accelerometers and compasses. Accelerometers and compasses, or other devices that are capable of detecting motion or position are available from any number of vendors and may sense motion in a variety of ways. For example, accelerometers may detect changes in acceleration while compasses may detect changes in orientation respective to the magnetic North or South Pole. These changes in motion may be detected by the device 650 and used to update the display of the respective devices 650 according to processes and techniques described herein.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

The invention claimed is:

1. A computer-implemented method comprising:
receiving for a plurality of times in a time period, a plurality of data points from an accelerometer and a plurality of data points from a magnetometer, the accelerometer and the magnetometer included in a mobile computing device;
for each of the data points, determining an orientation and a position of the mobile computing device based on an acceleration output and a magnetometer output that corresponds to the particular time;

determining a trajectory that represents movement of the mobile computing device during the time period based on the determined orientations and positions of the mobile computing device at the plurality of times;

comparing information that characterizes the trajectory to stored information that characterizes a set of one or more base trajectories;

based on the comparison, identifying an operation of the mobile computing device that is associated with a trajectory included in the set of one or more base trajectories, wherein identifying the operation of the mobile computing device comprises recognizing that a user holding the mobile computing device has made a gesture that corresponds to the trajectory and that is associated with operation of the mobile computing device, wherein the recognized gesture comprises a gesture associated with the operation of voice recording that comprises the user holding the mobile computing device to the user's face such that a microphone on the mobile computing device is close to the user's mouth and a speaker on the mobile computing device is away from the user's face; and automatically initiating a voice recording operation in response to recognizing that the user has made the gesture.

2. The method of claim 1, wherein:

each accelerometer output comprises a gravity component and a positional component; and determining the orientation and the position of the mobile computing device comprises:

determining the orientation of the mobile computing device based on the magnetometer output;

determining the gravity component of the accelerometer output based on the determined orientation of the mobile computing device;

determining the positional component of the acceleration output based on the gravity component; and determining the position of the mobile computing device based on the positional component of the accelerometer output.

3. The method of claim 1, further comprising receiving optical signals from the mobile computing device, wherein determining the trajectory that represents movement of the mobile computing device further comprises processing the optical signals to the camera to derive optical flow information.

4. The method of claim 1, further comprising sending a signal to the user that the computing device is in voice recording operation, wherein the signal is selected from the group consisting of an audible signal, a tactile signal, and a visual signal.

5. The method of claim 1, further comprising, after initiating voice recording:

receiving for a second plurality of times in a second time period, a second plurality of data points from the accelerometer and a second plurality of data points from the magnetometer;

for each of the second plurality of data points from the accelerometer and second plurality of data points from the magnetometer, determining a second orientation and a second position of the mobile computing device based on an acceleration output and a magnetometer output that corresponds to the particular time;

determining a second trajectory that represents movement of the mobile computing device during the second time period based on the determined orientations and positions of the mobile computing device at the second plurality of times;

comparing information that characterizes the second trajectory to the stored information that characterizes the set of one or more base trajectories;

based on the comparison, identifying a second operation of the mobile computing device that is associated with a trajectory included in the set of one or more base trajectories, wherein identifying the second operation of the mobile computing device comprises recognizing that a user holding the mobile computing device has made a second gesture that corresponds to the second trajectory and that is associated with operation of the mobile computing device, wherein the recognized second gesture comprises a gesture associated with a non-operating position; and automatically terminating the voice recording operation in response to recognizing that the user has made the second gesture.

6. A computer-readable storage medium storing instructions encoded thereon, which, when executed by a processor, cause the processor to perform operations comprising:

receiving for a plurality of times in a time period, a plurality of data points from an accelerometer and a plurality of data points from a magnetometer, the accelerometer and the magnetometer included in a mobile computing device;

for each of the data points, determining an orientation and a position of the mobile computing device based on an acceleration output and a magnetometer output that corresponds to the particular time;

determining a trajectory that represents movement of the mobile computing device during the time period based on the determined orientations and positions of the mobile computing device at the plurality of times;

comparing information that characterizes the trajectory to stored information that characterizes a set of one or more base trajectories; and based on the comparison, identifying an operation of the mobile computing device that is associated with a trajectory included in the set of one or more base trajectories, wherein identifying the operation of the mobile computing device comprises recognizing that a user holding the mobile computing device has made a gesture that corresponds to the trajectory and that is associated with the operation of the mobile computing device, wherein the recognized gesture comprises a gesture associated with the operation of voice recording that comprises the user holding the mobile computing device to the user's face such that a microphone on the mobile computing device is close to the user's mouth and a speaker on the mobile computing device is away from the user's face.

7. The method of claim 1, wherein automatically initiating the voice recording operation is in response to identifying both the position and orientation of the mobile computing device.

8. A mobile computing device comprising:

an accelerometer configured to provide an accelerometer output that indicates an acceleration of the mobile computing device;

a magnetometer configured to provide a magnetometer output that indicates a direction the mobile computing device is pointing relative to magnetic North;

a processor;

a storage device coupled to the processor and configurable for storing instructions, which, when executed by the processor cause the processor to perform operations comprising:

receive for a plurality of times in a time period, a plurality of data points from the accelerometer and a plurality of data points from the magnetometer;

for each of the plurality of times in the time period, determine an orientation and a position of the mobile computing device based on the acceleration output and the magnetometer output that corresponds to the particular time;

determine a trajectory that represents movement of the mobile computing device during the time period based on the determined orientations and positions of the mobile computing device at the plurality of times in the time period;

based on a comparison of information that characterizes the trajectory to a set of one or more base trajectories, identifying the operation of the mobile computing device that is associated with the trajectory included in the set of one or more base trajectories, wherein identifying the operation of the mobile computing device comprises recognizing that a user holding the mobile computing device has made a gesture that corresponds to the trajectory and that is associated with the operation of the mobile computing device; and based on the comparison, automatically launching the operation of the mobile computing device that is associated with a trajectory included in the set of one or more base trajectories, wherein the recognized gesture comprises a gesture associated with the operation of voice recording that comprises the user holding the mobile computing device to the user's face such that a microphone on the mobile computing device is close to the user's mouth and a speaker on the mobile computing device is away from the user's face.

9. The mobile computing device of claim 8, wherein the operations further comprise:
comparing the information characterizing the trajectory to the set of one or more base trajectories.

10. The mobile computing device of claim 8, wherein:
each accelerometer output comprises a gravity component and a positional component; and
determining the orientation and the position of the mobile computing device comprises:
determining the orientation of the mobile computing device based on the magnetometer output;
determining the gravity component of the accelerometer output based on the determined orientation of the mobile computing device;
determining the positional component of the acceleration output based on the gravity component; and
determining the position of the mobile computing device based on the positional component of the accelerometer output.

11. The mobile computing device of claim 8, wherein the operations further comprise:
sending a signal to the user that the computing device is in voice recording operation, wherein the signal is selected from the group consisting of an audible signal, a tactile signal, and a visual signal.

12. The mobile computing device of claim 8, wherein the operations further comprise:
receiving optical signals from a camera, the camera included from the mobile computing device, wherein determining the trajectory that represents movement of the mobile computing device further comprises processing the optical signals to derive optical flow information.

13. The computer-readable storage medium of claim 6, the operations further comprising:
automatically initiating a voice recording operation in response to recognizing that the user has made the gesture.

14. The computer-readable storage medium of claim 6, wherein:
each accelerometer output comprises a gravity component and a positional component; and
determining the orientation and the position of the mobile computing device comprises:
determining the orientation of the mobile computing device based on the magnetometer output;
determining the gravity component of the accelerometer output based on the determined orientation of the mobile computing device;
determining the positional component of the acceleration output based on the gravity component; and
determining the position of the mobile computing device based on the positional component of the accelerometer output.

15. The computer-readable storage medium of claim 6, the operations further comprising:
receiving optical signals from the mobile computing device, wherein determining the trajectory that represents movement of the mobile computing device further comprises processing the optical signals to derive optical flow information.

* * * * *